July 10, 1923.

J. REECE ET AL 1,461,559

POWER TRANSMISSION APPARATUS

Filed Jan. 25, 1922

John Reece &
Franklin A. Reece
Inventors,
by Rogers, Kennedy & Campbell
Attorneys.

John Reece &
Franklin A. Reece
Inventors,
by Rogers, Kennedy & Campbell,
Attorneys.

Patented July 10, 1923.

1,461,559

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER-TRANSMISSION APPARATUS.

Application filed January 25, 1922. Serial No. 531,593.

*To all whom it may concern:*

Be it known that we, JOHN REECE and FRANKLIN A. REECE, citizens of the United States, residing at Boston and Brookline, respectively, in the counties of Suffolk and Norfolk and State of Massachusetts, have invented certain new and useful Improvements in Power-Transmission Apparatus, of which the following is a specification, reference being had therein to the accompanying drawing.

This invention is a novel power transmission apparatus adapted to use in various situations and for various purposes, for example, as a part of the power transmission mechanism of motor vehicles.

The general object is to provide an improved variable speed transmission for motor vehicles, and more especially to afford a mechanism by which the speed ratio between the engine and the driven parts is self-adjusting to any required degree between the maximum and minimum, so as to deliver the requisite torque to the driven parts. With a motor vehicle this means that the speed ratio and torque of the mechanism are self-varying to suit the road conditions, for example when running from level ground to uphill the mechanism will so operate as to deliver greater torque at slower speed, the car slowing down and climbing the hill without requiring the attention of the operator; it being understood of course that the operator has supplemental control through the throttle, so that he can cause the engine to speed up when the ratio decreases and vice versa. The present invention therefore, while working in effective cooperation with the throttle, is independent thereof, and has to do merely with the transmission between the driving and driven shafts.

There has already been filed an earlier application, relating to the same general objects as above stated, but in said prior application, Serial No. 364,897, filed Mar. 11, 1920, the transmission is not continuous, in the full sense, but is intermittent, and requires a reservoir or spring to be employed, from which the ultimate driven shaft can be rotated in a continuous manner. An object of the present invention is to afford an apparatus in which the transmission is continuous and in which pulsating or irregular action is minimized. Other objects and advantages will be made clear in the following description of one form or embodiment of the present invention or will be obvious to those skilled in the art.

To the attainment of the objects and advantages mentioned, the present invention consists in the novel variable speed transmission and the novel features of combination, arrangement, mechanism, design, detail, and method herein described or claimed.

Preliminarily, it may be stated that this invention employs the principle, already explained in the prior application, of planetating weights carried around with the fly wheeel or driving member and having inward and outward movements produced by or in proportion to the difference in speeds of the driving and driven shafts, the weights so arranged that the centrifugal force thereof, opposing the inward pulling thereof, operates to produce a forward thrust or transmission. Each weight passes through two phases of action, namely moving inwardly, as just described, and subsequently returning outwardly, during which phase, in the prior application, transmission is suspended, so that the action is intermittent. In the prior application this required a pawl and ratchet, or equivalent device, to prevent reverse movement of the driven parts, and also an elastic transmitting element or spring to give continuity or steadiness of rotation of the final driven member. In the present case we have done away with the non-transmitting phase and have provided a mechanism by which energy is constantly transmitted from the driving member through the centrifugal weights to the driven member. The herein described means of securing this result constitutes one of the important features of the present invention, and other features of novelty are involved, as will be elucidated in explaining the specific embodiment hereof.

In the accompanying drawings, Figure 1 is a central, longitudinal section of a power transmission apparatus embodying the present invention, the upper part a vertical section and the lower part a horizontal section as indicated by the section line 1—1 of Figure 2;

Figure 1:
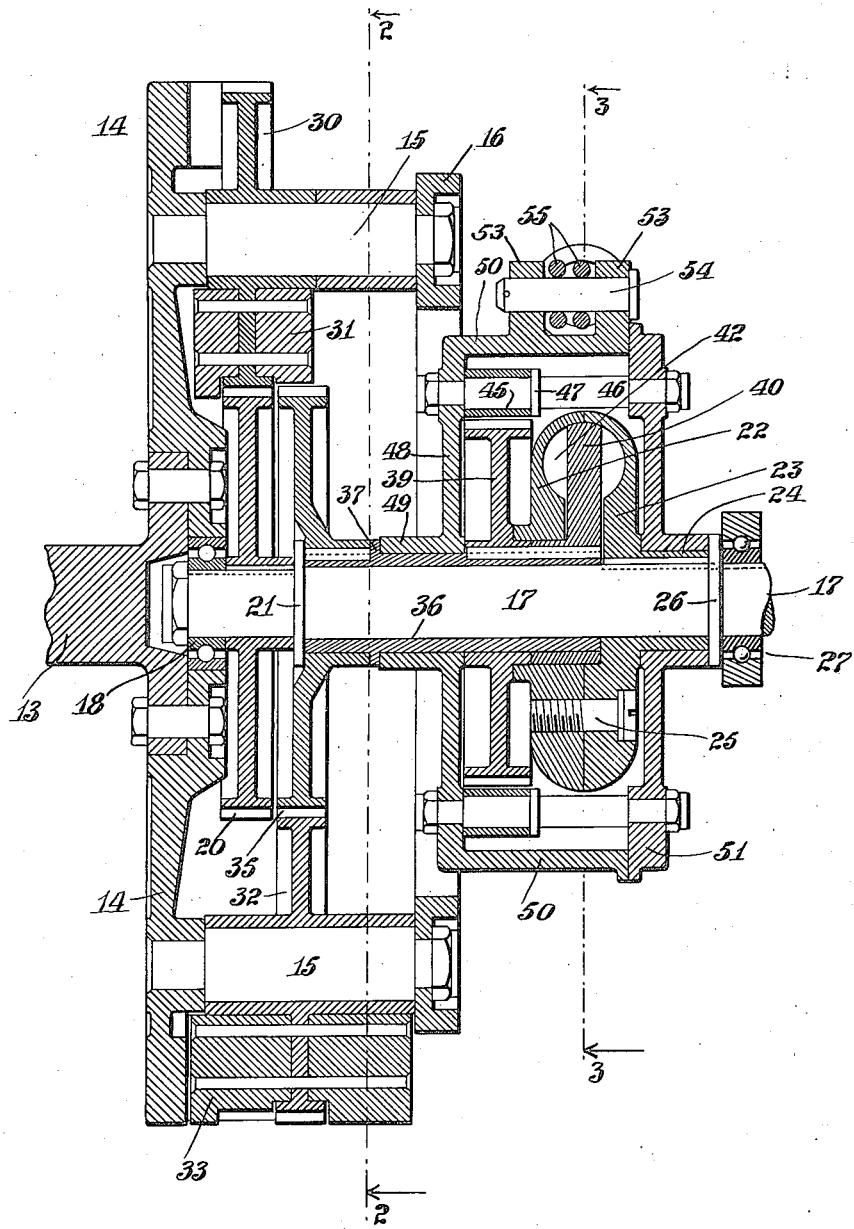

In order to simplify the explanation of the principles hereof, we have dispensed with any reversing mechanism and the complications of illustration which would be entailed thereby;—but it will be understood that the present invention may be used for motor cars and employed either in forward or reverse driving, namely by any suitable reversing devices, whether or not embodied in the transmission mechanism, for example by a wholly separate arrangement of reversing gears of any well known type.

What may be termed the driving member of the present invention is shown as comprising the engine shaft 13, on which is secured the fly wheel or rotating disk 14. Four planet studs 15 are shown spaced around the fly wheel and extending toward the right, and a connecting ring 16 is secured to the right ends of all of the studs. These described elements 13–16 rotate as a rigid driving member.

The driven member comprises primarily the driven shaft 17. A bearing 18 is shown between the shaft and a portion of the driving member. A central gear 20 is keyed near the left end of the driven shaft, and therefore constitutes substantially a part of the driven member. The shaft is shown formed with a collar or rib 21, serving for endwise spacing of the parts mounted on the shaft. Another element rigid with the driven shaft is what may be termed a casing or barrel 22, 23, adapted to contain a spring hereafter to be described, and being built up of a left side or casing wall 22 and a right side or wall 23, the latter having a hub or sleeve 24 keyed to the driven shaft. Bolts 25 hold together the two parts of the barrel. Near the right end of the driven shaft is shown a washer 26 which may be held against relative rotation by the same key that holds the hub 24. To the right of the washer is shown a ball bearing 27. This completes the description of the driven member and parts rotating rigidly with it.

According to the preferred embodiment of this invention, a pair or series of heavier planetating weights is employed, arranged first to give a forward impulse to the driven shaft, in the manner already described, and in the succeeding phase to be come disconnected so as not to retard the driven shaft; while a second pair or set of planetating weights, of lighter weight, or less centrifugal force, is brought into action to deliver forward driving impulse to the driven shaft during the phase that the heavier weights are not driving. The lighter weights may act directly upon the driven shaft, since the retarding effect during their second phase is greatly overcome by the forward driving effect of the heavier weights. Stated another way, from the viewpoint of the driven shaft, in one phase it is urged forwardly by the action of the heavier weights, this being partly offset by the retarding effect of the lighter weights, and in the second phase is urged forwardly by the lighter weights, without any effect from the heavier weights. While the heavier weights are moving outwardly, their centrifugal force is preferably employed to throw the unused energy thereof back into the driving member, with the result of accelerating it, the energy thereby eventually being delivered to the driven shaft.

On two opposite planet studs 15 are mounted corresponding planetating pinions 30, each carrying a relatively light centrifugal weight 31. The other two planet studs carry planet gears 32, which carry relatively heavy planetating weights 33.

Figure 2:
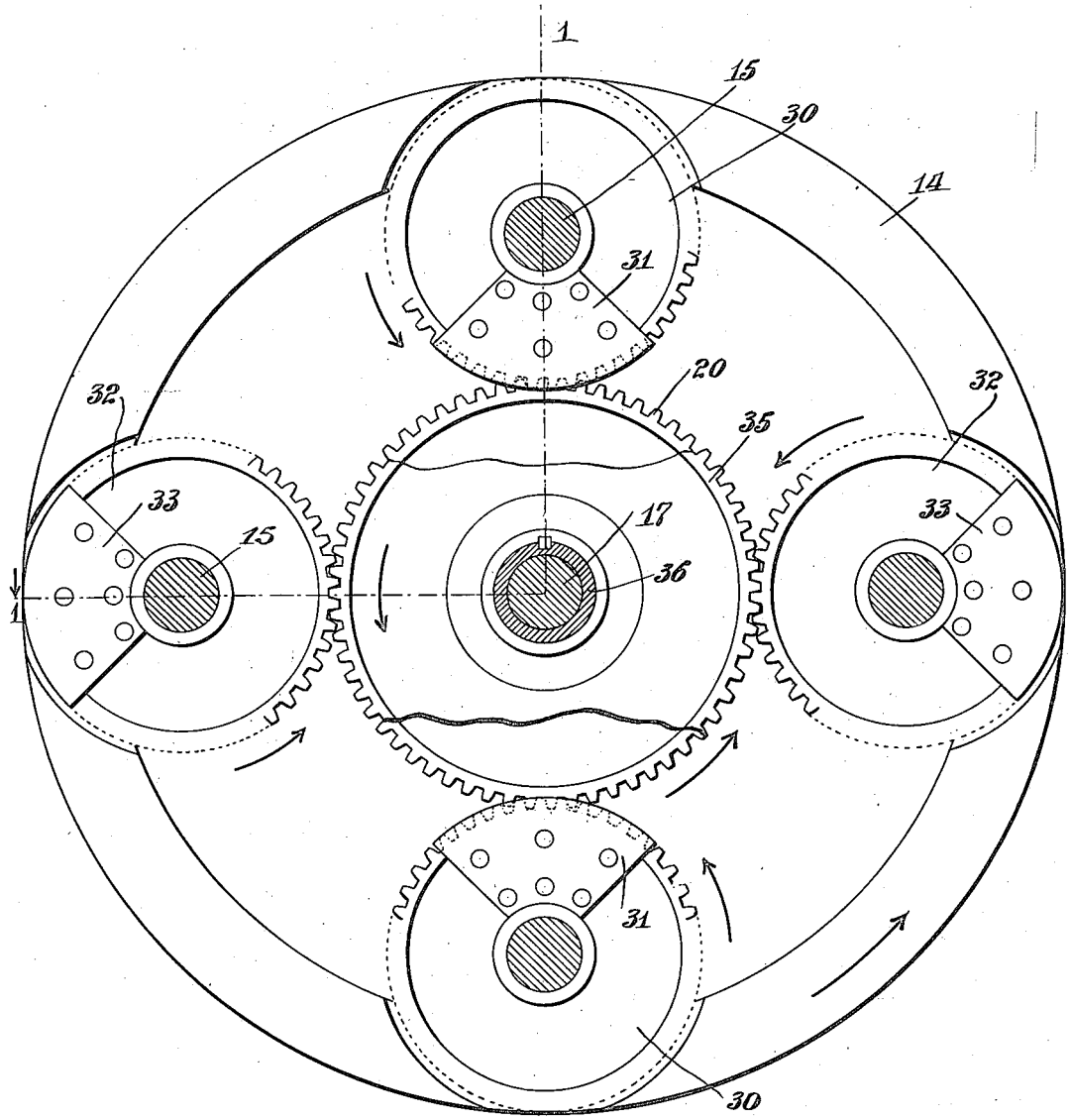
Figure 2 is a transverse section taken on the line 2—2 of Figure 1, and partly broken away, the arrows showing the direction of rotation of the several parts.

It is intended that the heavier weights shall be moving inwardly when the lighter weights are moving outwardly, and vice versa, and in Figures 1 and 2 the weights are shown in opposite positions in accordance therewith.

The several planetating pinions 30, carrying the lighter weights are all in mesh with the central gear 20 which is keyed directly upon the driven shaft 17. By this arrangement, when the driven shaft rotates slower than the driving shaft, the lighter weights are caused to planetate, and in one phase, while moving inwardly, cause the delivery of torque to the driven shaft, in the other phase, while moving outwardly, applying a reverse torque, thus tending to retard the driven shaft. This retarding action would offset the forward impulse of the first phase but for the fact that the heavier planetating weights are arranged to operate to deliver forward torque to the driven shaft to substantially overcome the retardation of the lighter weights.

The planetating gears 32 carrying the heavier weights, engage a central gear 35 which is keyed, not to the driven shaft, but to a sleeve 36, which may be termed a transmitting sleeve, the rotation thereof being delivered to the driven shaft in a forward direction only, by the connections to be described. The sleeve 36 is formed with a rib or collar 37 for positioning the parts surrounding it. Keyed to the sleeve is a ratchet wheel 39, taking part in the intermittent drive action referred to. The sleeve also has keyed to it the hub of an outstanding arm or finger 40. The described elements 35 to 40 are substantially rigid. The arm 40 is arranged to engage against one end of a compression coil spring 41 arranged annularly within a chamber 42 formed in the barrel 22, 23, keyed to the driven shaft, as already described. The arm of the transmitting sleeve, and the spring within the barrel of the driven shaft, constitute a resilient driving connection between the sleeve and the shaft. The average speed of the sleeve, which rotates irregularly or intermittently, is hence the same as the actual speed of the shaft, the resilient connection allowing the shaft to rotate ahead of the sleeve for a partial rotation, and allowing the sleeve, with attached arm, to then make up this loss. The spring stands ready to act as a buffer. Therefore, notwithstanding the intermittent action of the transmitting sleeve and arm, the driven shaft is able to rotate steadily and with continuous torque applied thereto.

To carry out the purposes of this invention, it is necessary that the sleeve 36 rotate forwardly when the heavier weights are being forced inwardly, while prevented from rotating reversely during the period when the weights are again moving outwardly. The ratchet wheel 39, keyed to the sleeve, takes part in this operation. The ratchet is shown engaged by a series of pawls 45, which are so spaced with respect to the teeth of the ratchet, as to give very quick engagement by one or more pawls when the sleeve has a tendency to rotate reversely, the pawls thus immediately bringing the sleeve to a stop and holding it until the next forward impulse. While the planetating weights are being pulled inwardly, the centrifugal force thereon effects a resistance to the planetating rotation, thereby causing energy to be delivered from the fly wheel to the central gear and sleeve; but when the weights pass their inward dead centers, the centrifugal force is reversed and the weights throw outwardly. The tendency, during this phase, to throw back the central gear, is met by the pawl and ratchet, which holds the sleeve stationary against reverse rotation, permitting it only to rotate forwardly.

The pawls 45 are mounted on a series of studs 46, which also serve as bolts to hold together the parts that carry the pawls. Each stud 46 has a flange or rib 47 to confine the pawl to a position opposite to the ratchet. The pawls and studs are carried in a sort of casing or carrier comprising at the left side a web or wall 48, the hub or flange 49 of which turns loosely on the sleeve 36, also a cylindrical extension or wall 50, and at the right-hand side a second annular wall or cover 51, the various parts held together, as before stated, by the studs 46. A series of pawl springs 52 are shown by which each pawl is pressed constantly toward the ratchet.

The case or pawl carrier 48 should be held stationary, or substantially so, for the purposes of this invention. We have shown, however, a very slight yield or cushion effect, so that when the thrust of the planetating parts or transmitting sleeve is reversed there can be no injurious shock. Exterior of the case, at its top side, are a pair of lugs 53 supporting a cross pin 54, which is engaged by two oppositely acting springs 55, under heavy tension or comparatively rigid in their action, thus giving the desired cushion effect without permitting substantial play of the pawl carrier.

Figure 3:
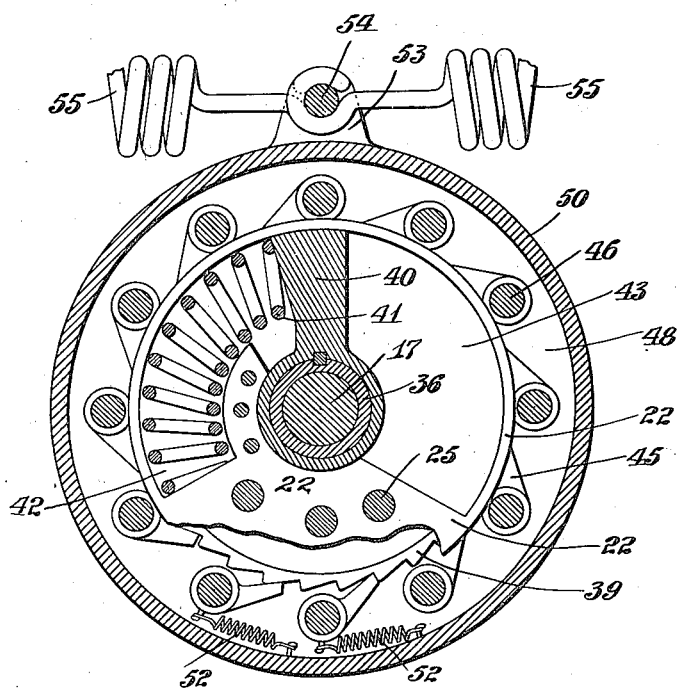
Figure 3 is a transverse section taken on the line 3—3 of Figure 1.
Figure 4:
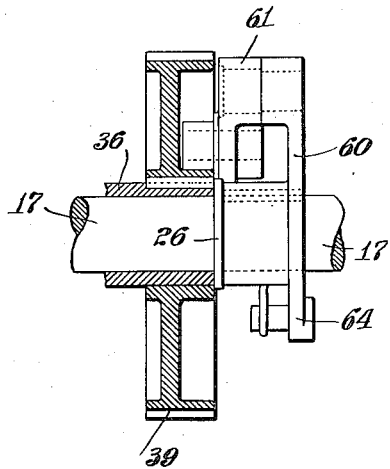
Figure 4 is a longitudinal section of a modification of certain elements of the invention.
Figure 5:
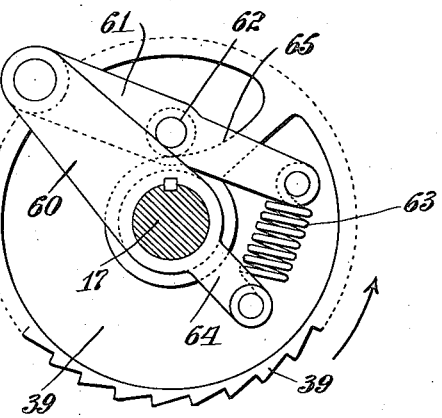
Figure 5 is a right-hand elevation of the mechanism shown in Figure 4.

Figures 4 and 5 show a mode of providing elastic connection between the transmitting sleeve and the driven shaft, different from that shown in Figures 1 and 3. The driven shaft 17 is shown as having keyed thereto an arm 60, to the extremity of which is pivoted a link 61 having a cam roller 62 near its middle. A strong spring 63 connects the extremity of the link 61 with an extension 64 of the arm. By this arrangement, the roller stud is constantly forcibly pulled toward the shaft. The stud is shown engaging a curved surface or cam 65 formed or carried on the transmitting sleeve, for example on the web of the ratchet wheel 39. The result of this arrangement is that if a forward impulse on the ratchet wheel and cam occurs, which tends to throw the roller outwardly, the resistance of the spring to this action causes forward thrust upon the arm 60 and driven shaft. The arrangement, like the other, is one wherein the driven shaft may advance steadily, while the transmitting member and the cam advance irregularly, resiliently delivering torque to the driven shaft in those phases when the transmitting sleeve is carrying sufficient torque to enable this, that is, while the heavier weights are being pulled inward.

The operation is best described on the embodiment of Figs. 1, 2 and 3. As explained the operation is in two phases. The action of the gears carrying the heavier weights is substantially in coordination with those carrying the lighter weights. There is a slight variation or oscillation because the two central gears 20 and 35 are not rigidly connected but have a slight play. This is due to the slight play that is possible between the intermediate sleeve 36 and the driven shaft. Ignoring the slight differences in coordination, the operation in the first phase is that the heavy weights are moving inwardly against centrifugal force while the light weights are moving outwardly assisted by centrifugal force. Therefore, the centrifugal force in the heavy weights tends to retard the gears 32 which mesh with the central gear 35, thus causing forward thrust on the latter. This powerful driving action on the central gear is communicated through the spring to the driven shaft, the spring changing slightly under the strain from time to time when there are irregularities of action, so that the driven shaft may take power therefrom at a substantially uniform rate, giving steady drive. During this phase the outward force of the lighter weights 31, tending to accelerate the rotation of the gears 30, causes a retarding effect on the central gear 20 and driven shaft, but this is far overcome by the driving action described, so that the effect is merely to reduce the torque. The power or torque subtracted by the lighter weights during the first phase is restored during the second phase, the drive thereby being rendered substantially continuous, as will now be described. During the second phase the light weights are being pulled inwardly against centrifugal force, and their resistance to the rotation of the planet gears 30 brings about a forward thrust upon the central gear 20 and driven shaft. In the same phase the heavy weights are moving outwardly but the force thereof is not permitted to effect a retarding of the driven parts. Instead the one-way device or pawl and ratchet 39, 45 takes the backward thrust, forming a stationary element against which the centrifugal force acts. The result is a tendency to increase the planetating rotation of the gears 32 and thereby effect a forward thrust upon the driving member or fly wheel. This torque or acceleration in the fly wheel operates to increase the speed thereof and the centrifugal force of the several weights, which eventually reaches the driven shaft in the form of increased torque or speed. It will be noticed that the spring 41 serves not only to equalize and steady the speed of the driven shaft but also it permits the shaft to be driven forwardly by the lighter centrifugal weights during the phase when the heavier weights are thrusting the intermediate parts reversely and holding them stationary against the pawl and ratchet. Also the space 43 behind the arm 40 gives free play, allowing the driven shaft to be turned ahead during the first phase. In a broad aspect the purpose of the planetating weights is to afford resistingly yielding and reasserting devices, for which springs might be substituted, without however attaining the full advantages of this invention. The two sets of weights or devices are for the purpose of operating alternately on the driven shaft, one of them maintaining the driving action during the phase in which the other is not transmitting, whereby substantially continuous transmission is secured.

It will thus be seen that we have described a power transmission apparatus embodying the principles and attaining the objects and advantages of the present invention. Since many matters of construction, combination, arrangement and detail may be variously modified without departing from the novel principles of the present invention it is not intended to limit the invention to such matters except in so far as specified in the appended claims.

What is claimed is:

1. A variable speed transmission apparatus comprising in combination, a rotating driving member, a yielding and reasserting device carried on said driving member, a rotatable driven member, a train of connections, between said device and the driven member, including a one-way control means controlling the same, whereby rotation is transmitted through said device, in one direction only, to the driven member, and a second such device and connections for transmitting to the driven member when the first device is not transmitting.

2. Power transmission apparatus comprising in combination, the rotating driving and driven members, a greater centrifugal weight, and a lesser centrifugal weight each carried around with the driving member and movable inwardly and outwardly thereon, and connections from the weights to the driven member such that in one phase of action, when the driven member is rotating slower than the driving member, the first weight is moved inwardly against centrifugal force and acts to deliver power to the driven shaft, while in the next phase the first weight moves outwardly and the second weight moves inwardly, the centrifugal force in the first weight being thrown into the driving member, and the second weight acts to deliver power to the driven shaft, whereby substantially continuous transmission is secured.

3. Apparatus as in claim 2 and wherein an elastic transmitting element is interposed between the greater weight and the driven member, whereby to secure steadiness of drive despite irregularities of thrust.

4. Apparatus as in claim 2 and wherein the lesser weight planetates with a planetating gear engaging a gear directly on the driven member.

5. Apparatus as in claim 2 and wherein the greater weight planetates with a planetating gear engaging a central gear mounted on an intermediate member between which and the driven member extends an elastic transmitting element.

6. Apparatus as in claim 5 and wherein the elastic transmitting element is arranged annularly between outstanding portions of the intermediate and driven members.

7. Apparatus as in claim 2 and wherein all of the weights planetate with gears engaging central gears connected with the driven member.

8. Apparatus as in claim 2 and wherein the connections from the greater weights to the driven member include a stationary one-way device against which the centrifugal force thrusts in the second phase so as to exert forward thrust on the driving member.

9. Power transmission apparatus comprising an engine-actuated-fly-wheel, a driven shaft, a planetating gear on the fly wheel carrying a centrifugal weight, a central gear on the driven shaft engaging said planetating gear, said elements such that when driving at reduced speed ratio the weight is caused to planetate by reason of the speed difference between the fly wheel and driven shaft, moving inward in one phase so that its opposing centrifugal force tends to advance the central gear and driven shaft, and moving outward in the next phase so that its centrifugal force tends to retard the driven shaft, and means acting during such second phase to overcome such retarding effect and maintain forward drive, consisting of a second planetating gear on the fly wheel carrying a heavier centrifugal weight, a second central gear, an elastic connection between the second central gear and the driven shaft, such that the heavier weight acts during the second phase to deliver driving torque to the driven shaft, and a one-way device taking the reverse thrust of the heavier weight in the first phase.

In testimony whereof, we have affixed our signatures hereto.

JOHN REECE.
FRANKLIN A. REECE.